March 2, 1926.  
S. H. GOLDBERG  
1,574,882  
MACHINE FOR ARRANGING, COUNTING, AND GROUPING HAIRPINS OR LIKE ARTICLES  
Filed Feb. 13, 1919  
9 Sheets-Sheet 1

March 2, 1926.
S. H. GOLDBERG
1,574,882
MACHINE FOR ARRANGING, COUNTING, AND GROUPING HAIRPINS OR LIKE ARTICLES
Filed Feb. 13, 1919    9 Sheets-Sheet 2
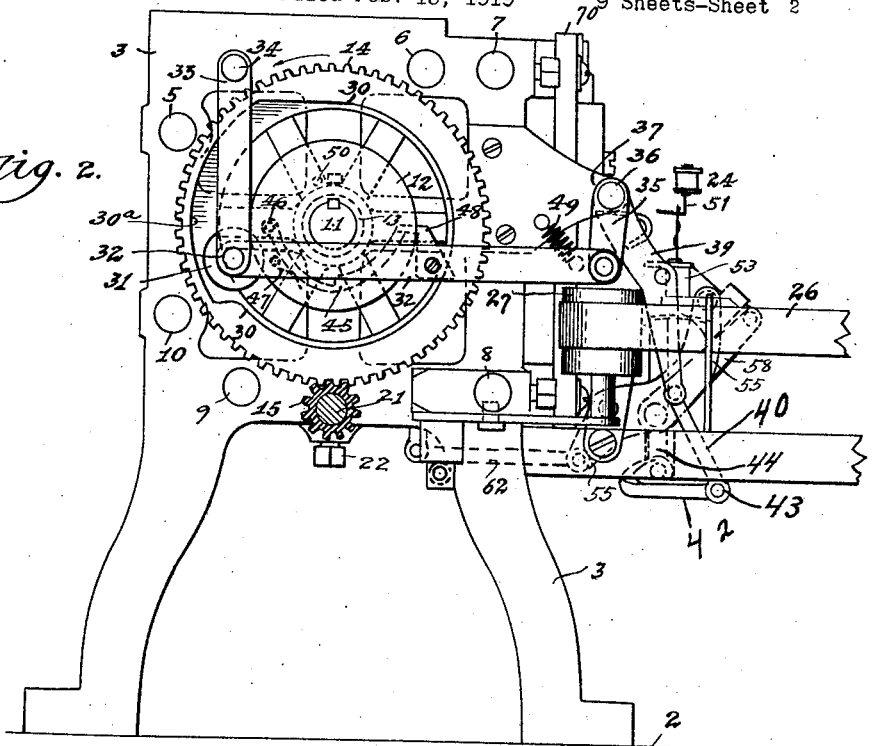

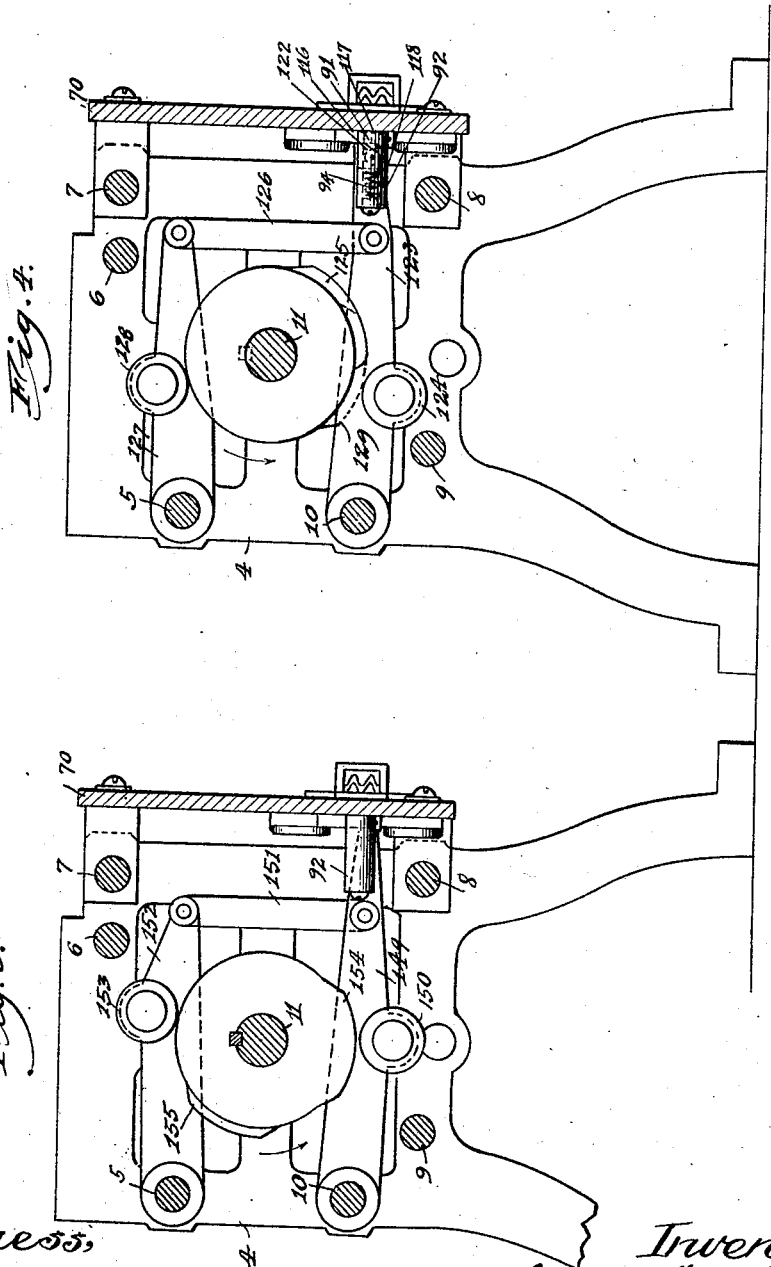

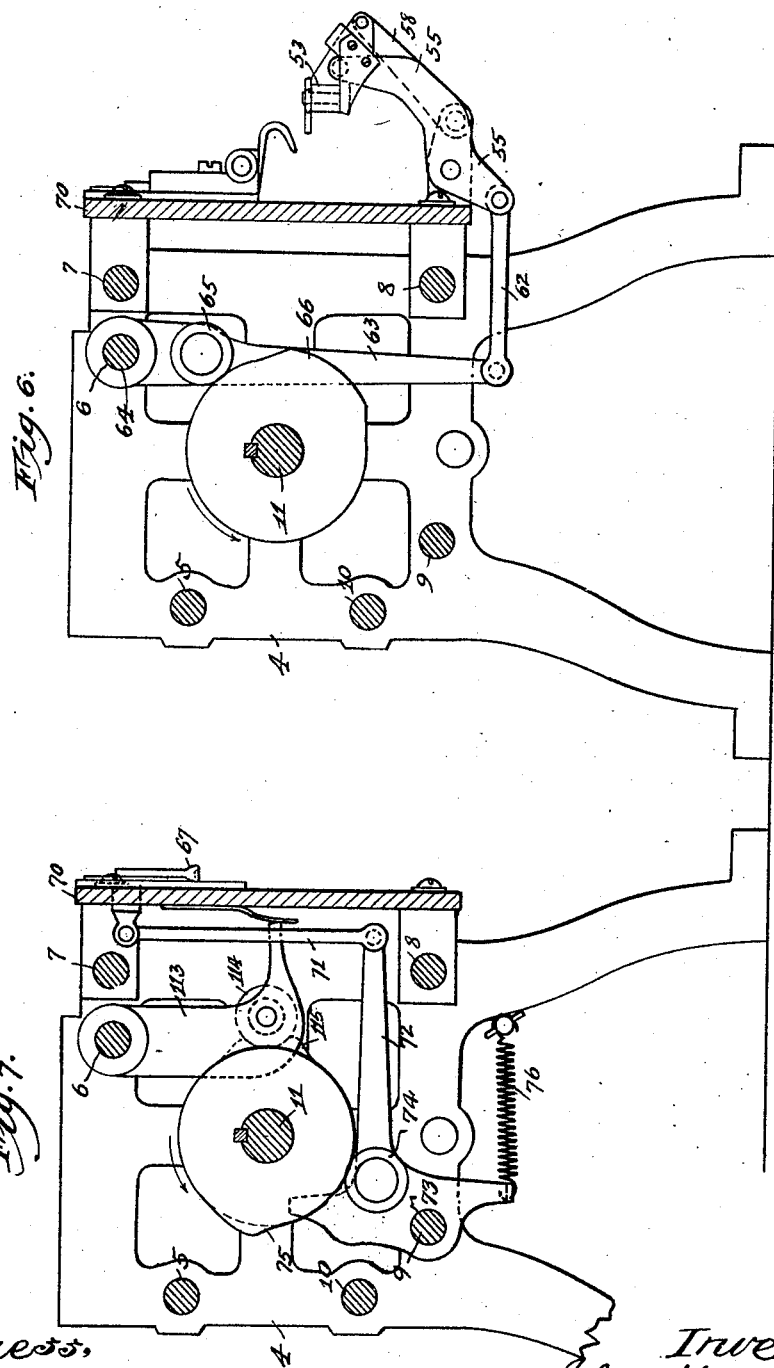

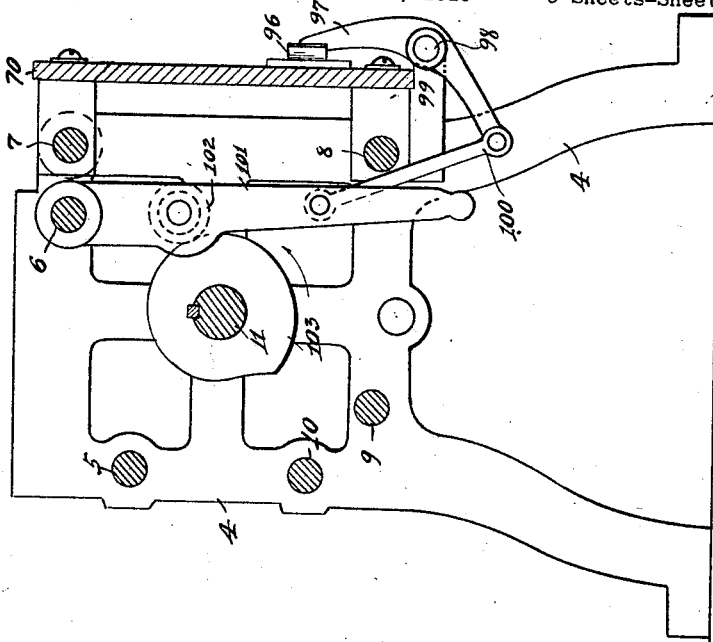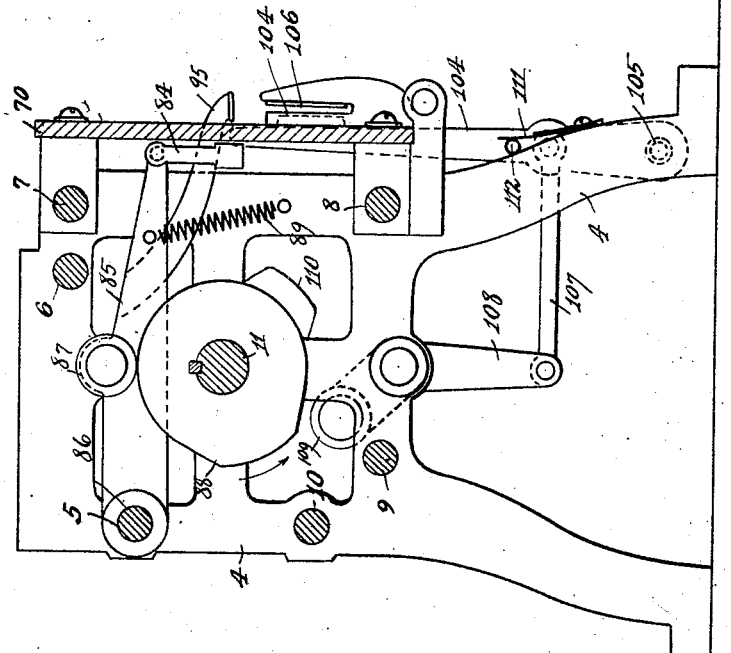

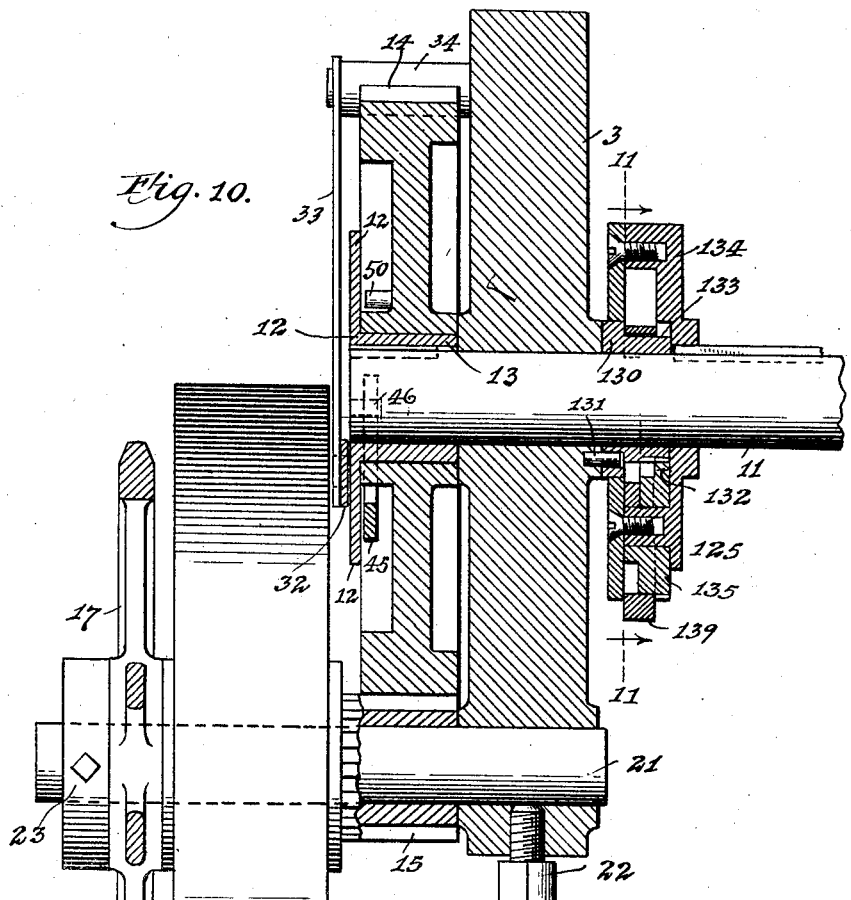
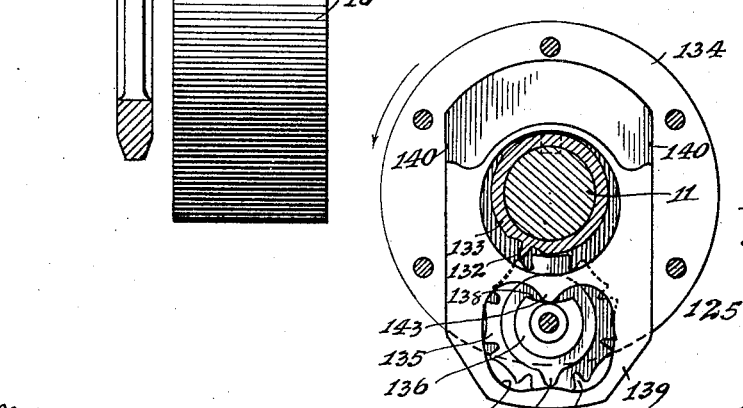

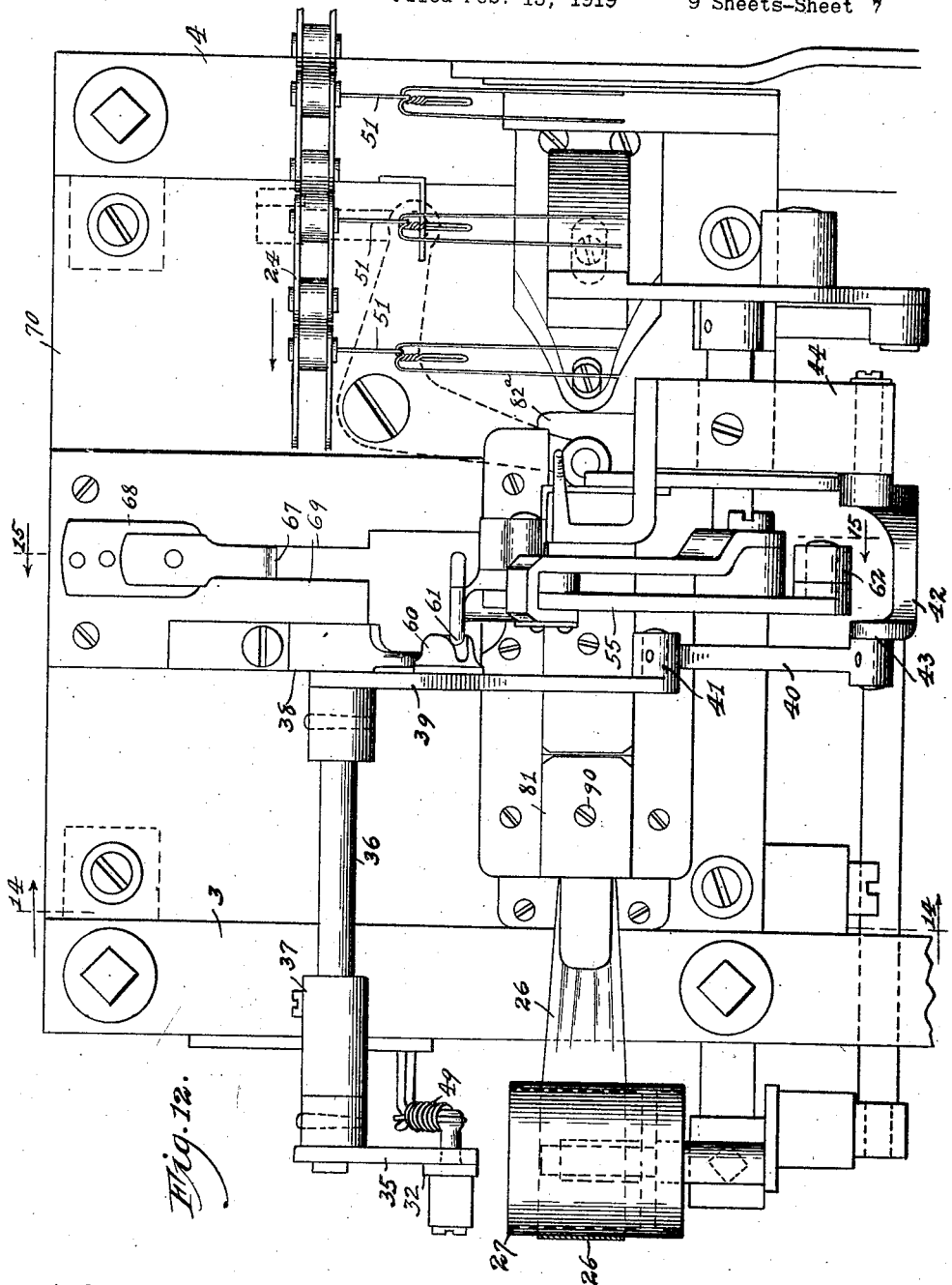

March 2, 1926.
S. H. GOLDBERG
1,574,882
MACHINE FOR ARRANGING, COUNTING, AND GROUPING HAIRPINS OR LIKE ARTICLES
Filed Feb. 13, 1919  9 Sheets-Sheet 8
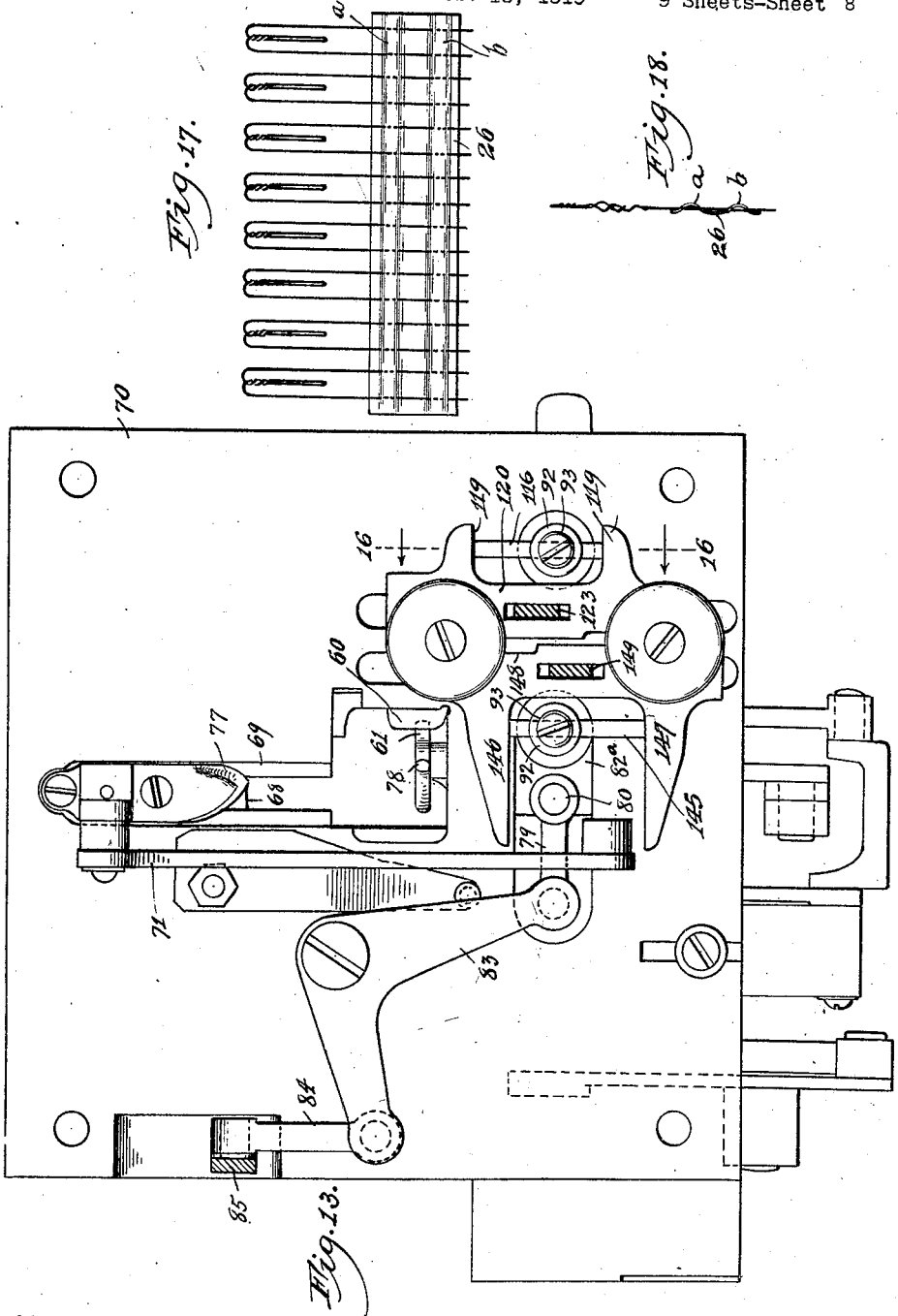

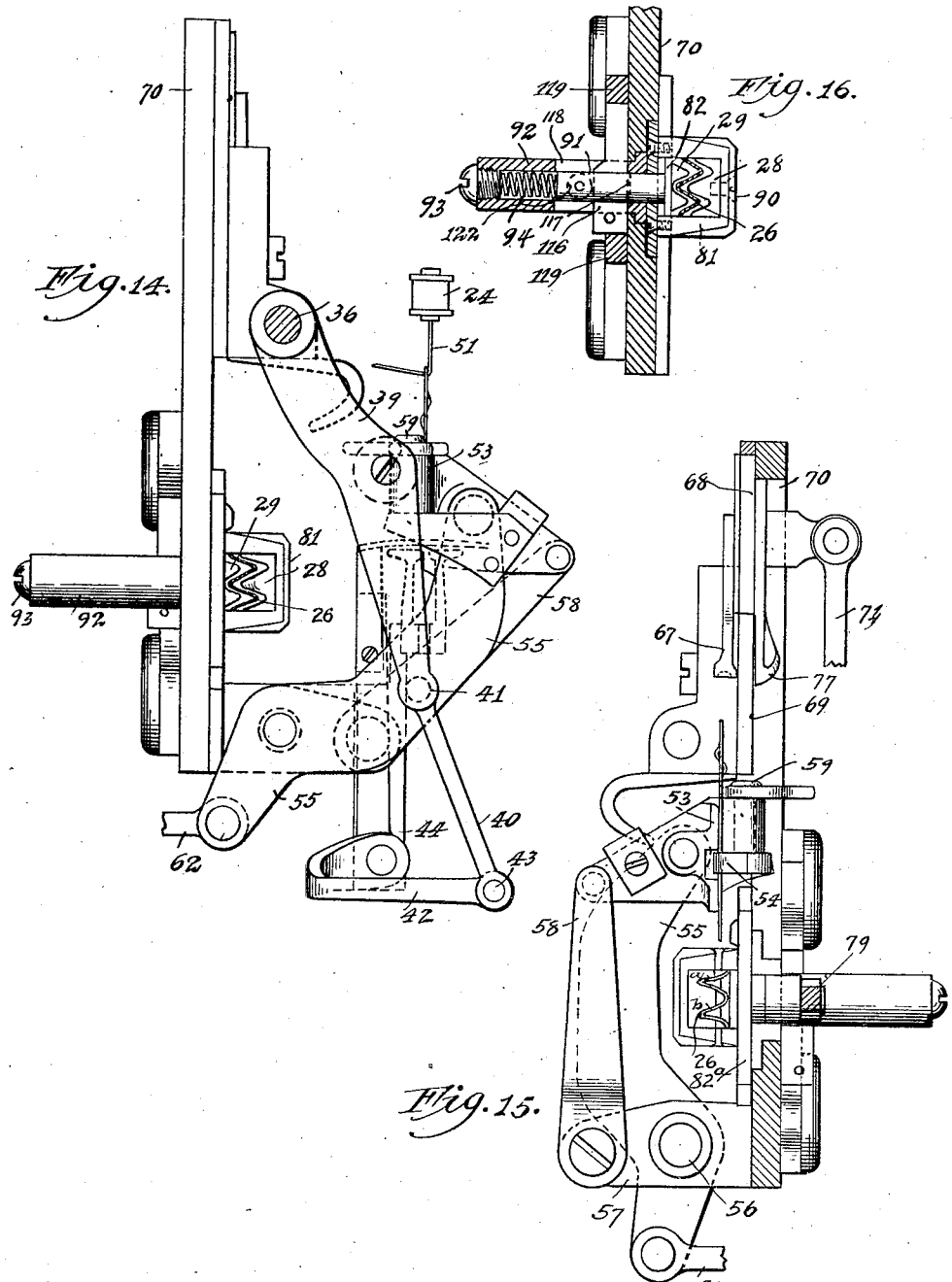

Patented Mar. 2, 1926.

1,574,882

UNITED STATES PATENT OFFICE.

SOLOMON H. GOLDBERG, OF CHICAGO, ILLINOIS.

MACHINE FOR ARRANGING, COUNTING, AND GROUPING HAIRPINS OR LIKE ARTICLES.

Application filed February 13, 1919. Serial No. 276,709.

*To all whom it may concern:*

Be it known that I, SOLOMON H. GOLDBERG, a citizen of the United States, residing in the city of Chicago, county of Cook, and State of Illinois, have invented certain new and useful Improvements in Machines for Arranging, Counting, and Grouping Hairpins or like Articles, of which the following is a specification.

This invention relates to a new and improved machine for arranging, counting, and grouping hairpins or like articles. In general the type of machine to which my invention relates is one in which the hairpins or similar articles are continuously fed to the selecting mechanism of the machine, automatically removed from the conveyor, and advanced by the several handling mechanisms, whereby the pins are positioned and applied to a strip of paper or like material and finally delivered from the machine in groups of predetermined numbers of pins, applied to uniform lengths of paper strips or like holding means.

The salient objects attained by the invention are accuracy in counting and grouping the articles handled, a saving of time and labor and altogether reducing labor and cost of production of attractively grouped articles of the class described.

In the drawings:

Fig. 2 is a front end view with parts omitted and parts in section for clearness of illustration.

Fig. 3 is a rear end view with parts omitted for clearness of illustration.

Figs. 4, 5, 6, 7, 8, 9, are sectional elevations taken on corresponding lines on Fig. 1 and viewed in the direction of the arrows applied thereto.

Fig. 10 is an enlarged sectional detail view of part of the driving mechanism.

Fig. 11 is a sectional view taken on the line 11—11 of Fig. 10 looking in the direction of the arrows.

Fig. 12 is an enlarged front elevation of one end of the machine with parts omitted for clearness of illustration.

Fig. 13 is a rear elevation of part of the mechanism shown in Fig. 12.

Fig. 14 is a view taken on the line 14—14 of Fig. 12 and looking in the direction of the arrows.

Fig. 15 is a view taken on the line 15—15 of Fig. 12 looking in the direction of the arrows but with the parts in changed relation to each other.

Fig. 16 is a sectional view taken of line 16—16 of Fig. 13 looking in the direction of the arrows.

Fig. 17 is a front elevation of a group of assembled hairpins.

Fig. 18 is an end view of the group of assembled hairpins.

Figure 1:
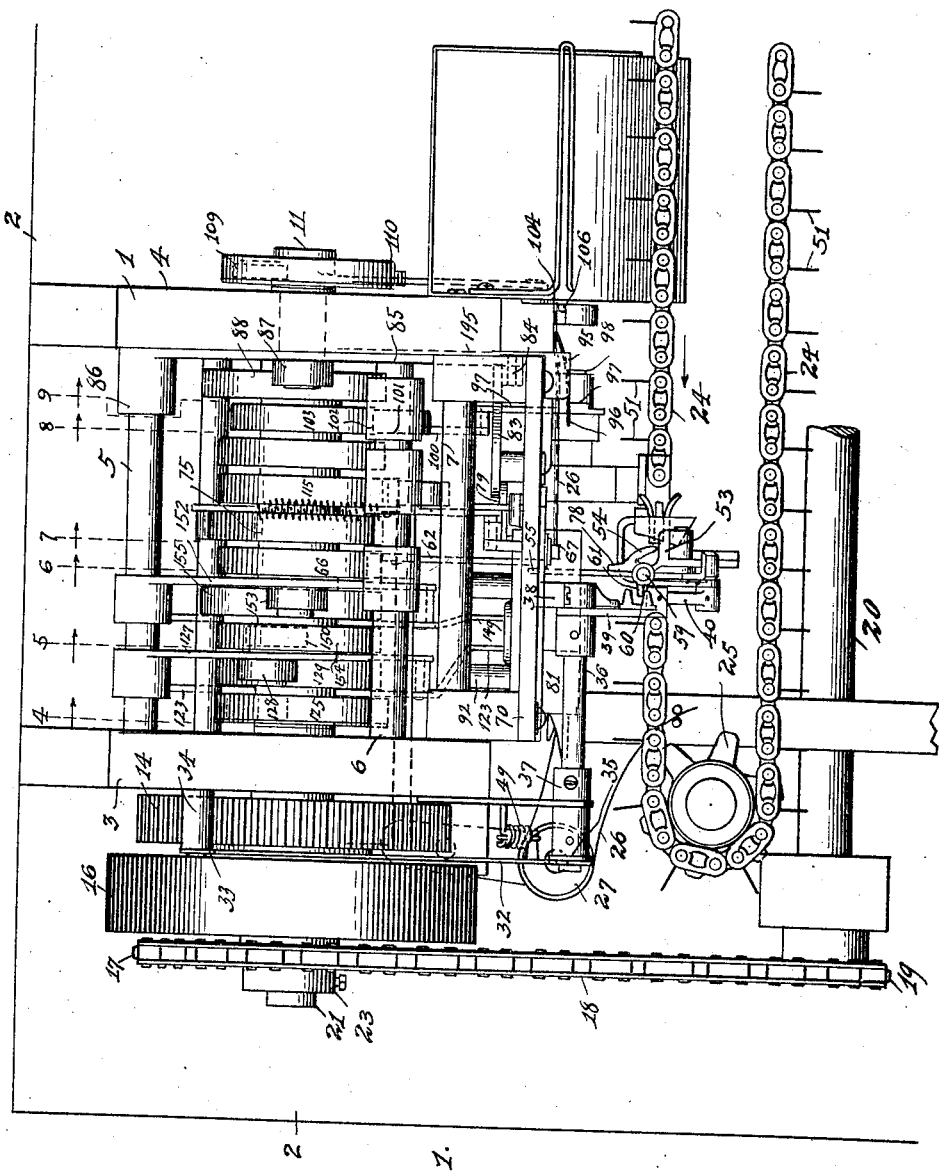
Fig. 1 is a plan view with parts omitted for clearness of illustration.

Taking up in detail the particular construction shown in the drawings, 1 represents the frame of the machine mounted upon a suitable base 2. The front end member 3 and rear end member 4 of the frame are connected by suitable tie rods 5, 6, 7, 8, 9, 10. A shaft 11 is journaled in the front and rear members and has keyed to the front end thereof a disc 12 having a hub 13 on which hub is loosely mounted the spur gear 14.

Rotary motion is imparted to gear 14 through pinion 15 fixed on pulley or balance wheel 16, sprocket 17, chain 18 sprocket pinion 19 and shaft 20, which shaft is driven from any source of power (not shown). Pinion 15 pulley 16 and sprocket 17 have fixed relation to each other and are loosely mounted on stub shaft 21 secured to frame member 3 by set screw 22 and they are held thereon by collar 23. Shaft 11 has mounted thereon a series of cams cooperating with associated mechanisms which will be described in their proper sequence of action, and these mechanisms are caused to act in timed relation to each other and also with the travel of a feeding means for delivering hairpins or like articles to be handled.

In the machine shown the articles are presented to the machine by a chain conveyor 24, moving in the direction indicated by the arrow and passing around the sprocket pinion 25 back to the source of supply which source of supply may be a japanning oven (not shown). 26 represents a strip of paper or like material leading from a roll or other source of supply (not shown) passing around a roller 27, between crimping jaws 28 and 29 for corrugating the paper for a purpose hereinafter to be described. Rotary motion being applied to gear 14 through the means just described, it will be noted that the gear 14 has an internal cam surface 30 which will act upon a roller 31 on link 32 which is pivotally secured at one end to an upright link 33 pivoted at 34 to the end plate 3. The other end of the link 32 is pivoted to a crank 35 on a shaft 36, suitably journaled in bearings 37 and 38. On the opposite end of shaft 36 is secured a crank 39 having a link 40 pivoted to its end at 41 and connecting the crank with a curved link 42 which curved link is pivoted thereto at 43 and has its other end pivoted to the bracket 44. The crank 35 cooperates with a transfer mechanism for removing the pins from the conveyor to the feeding mechanism which will be described later. A curved locking pawl 45 is pivoted at 46 to the disc 12 being spring pressed inwardly by the spring 47 and normally held against the spring 47 by contact with the tooth 48 on link 32. The link 32 is normally held in position to effect this outward position of the pawl by the spring 49. A cut away portion 30$^a$ in the internal cam surface 30 allows the link or bar 32 to assume the position with the several cooperating parts under the action of spring 49. The action of cam surfaces 30 on roller 31 causes the link 32 to shift and release the tooth 48 from contact with the pawl 45 allowing the latter to be engaged by a pin 50 on the gear 14 thereby causing the gear to be locked with the shaft 11 and rotate the shaft and actuate the associated mechanisms.

The hairpins are suspended upon hooks 51 secured at proper intervals on the conveyor chain 24 and are removed therefrom by gripping jaws 53 and 54. In actuation these gripping jaws 53 and 54 function by levers hereinafter described gripping the individual pins as they arrive in position between the jaws carried on the conveyor chain, practically simultaneously with the gripping of the pins that are moved horizontally due to the action of the levers functioning the jaws, and are slid from the hooks 51 from which they are suspended. These gripping jaws 53 and 54 are mounted on crank arm 55 pivoted at 56 to bracket 57 details of which are shown in Figs. 1–2–6–14 and 15. A link 58 connects the jaw member 53 with the bracket 57 and causes the jaw member 53 to swing on the pivot 56 to properly place and hold the hairpin in a vertical position. Jaw member 54 is pivoted at 59 to jaw member 53 and is held in closed or gripping position with the hair pin by reason of the block 60 shown in Fig. 12 on crank 39 engaging the pin 61 on the jaw member 54. Crank arm 55 is actuated through link 62, link 63 pivoted at 64, roller 65 on link 63 and cam 66 on shaft 11. Having removed a hairpin from the conveyor and brought the same into vertical position as just described the hairpin is positioned as shown in Fig. 15. The above described position is attained by the combined action of the mechanism for actuating the crank shaft 36 and crank arm 55.

The hairpin is next acted upon by a plunger 67 on plate 68, in ways 69 on face plate 70 which slide plate 68 is actuated through link 71, bell crank 72 pivoted at 73, roller 74 and cam 75, on shaft 11. Spring 76 acts to return the plate 68 and associated parts to normal position shown in Fig. 14. In the downward travel of the plate 68 the plunger 67 will engage the hairpin and force it downwardly and cause the legs of the pin to pierce the corrugations $a$ and $b$, of the paper strip 26. Simultaneously with this action, a shoe 77 on the plate 68 engages a projection 78 on the jaw 54 and turns the jaw on pivot 59 thereby releasing the jaws from gripping contact with the pin. The paper strip is presented to crimping jaws 28 and 29 which are confined in housing 81 and act upon the paper strip to crease or corrugate the same. Jaw 28 is a stationary jaw secured to the inner front wall of the housing 81 by screw 90. Jaw 29 is mounted on a stem 91 which stem is enclosed in a tube 92 secured with the plate 82 and has interposed between the end of the stem 91 and screw cap 93, a coiled spring 94 normally thrusting the stem and jaw into contact with the paper strip 26 which is thereby caused to be firmly held in a creased cross sectional shape. A similar pair of jaws are mounted on a slide plate 82$^a$ and movement is imparted to them through link 79 pivotally connected to bell crank 83, and acting with link 84, arm 85 pivoted at 86, roller 87 and cam 88 on shaft 11. Spring 89 connected to arm 85 and the end frame member 4, insures a return to normal position of the parts just described.

The hairpins are successively removed from the conveyor and applied to the paper strip which strip with the pins applied thereto is advanced along the face of the machine and subjected to means for leveling the row of pins thereon so that the top and bottom of the pins will be all along the same horizontal lines, which in the present construction is accomplished by the presser arm 95 on the pivoted arm 85. A light spring pressure is applied to the face of the paper strip and pins by the spring plate 96 through arm 97, pivoted at 98 to the bracket 99, link 100, pivoted arm 101, roller 102, and cam 103 on shaft 11. This mechanism is best shown in Figs. 3–8–9 and 13. The predetermined number of pins which is eight in the macrine just described constitute a group, and are severed from the oncoming strip by the knife 104 pivoted at 105 acting against shearing block 106. The knife 104 is actuated through link 107 crank 108, roller 109 and timed cam 110 on shaft 11. Cam 110 is a duplicate of cam 125.

Spring 111 on end frame 4 engages pin 112 on knife 104 and thereby causes the knife to normally assume a vertical position. After each intermittent movement of shaft 11, the proper alignment of the several mechanisms is assured by the cooperation of the spring pressed pivoted arm 113, roller 114 and centering cam 115 on shaft 11.

The paper feed is intermittent and each forward movement is a predetermined distance as has been described. The initial shaping of the paper strip is accomplished by the initial forming jaws and after this initial pressure has been accomplished it is desirable to release the jaws from gripping engagement with the paper strip. This is produced by a cam bar 116 slidably mounted in a slot 117 in the stem 91 and extending through slot 118 in tube 92. The ends of the cam bar are confined between ears 119 on a slide plate 120 slidably mounted on the face plate 70 of the machine. The cam bar acts against the antifriction roller 122 in the stem 91. Motion is imparted to the plate 120 through pivoted link 123 roller 124, cam 125, link 126 pivoted link 127 roller 128 and cam 129 on shaft 11. Cam 125 is of novel construction and is inoperative except at a determined point controlled by a fixed block 130 secured by pin 131 to end frame 3. The block 130 has a tooth 132 on a hub 133 through which block and hub the shaft 11 rotates. A cam shell 134 is keyed to shaft 11 and has revolubly mounted thereon a lost motion or star wheel 135. The hub 136 of the wheel 135 has a projection 137 and diametrically opposite the projection a cut away portion 138. A cam plate 139 is confined in ways 140 and loosely surrounds the hub and pin of the block 130. The cam plate 139 is apertured at 141 to receive the hub and pin of the wheel 135. As the shaft 11 is rotated, the wheel 135 is stepped around by reason of the grooves 142 therein engaging the pin 132 on the hub 133 until the cut away portion 138 of the hub of the wheel 135 is caused to register with the tooth 143 on the plate 139. When the parts just described are in the position shown in Fig. 11, the cam plate is extended into operative position and will actuate the initial crimping mechanism. A slide bar 145 similarly mounted to bar 116 and slidable between projections 146 and 147 on plate 148 serves to shift the gripping or crimping jaws on the slide plate 82ª. Motion is imparted to plate 148 through pivoted link 149 roller 150, link 151, pivoted link 152, roller 153, cam 154 and cam 155 on shaft 11.

The operation of the machine will be fully understood from the description without further going into details.

While I have shown and described in detail certain adjustments and certain mechanisms for driving various parts of the machine, the invention is not limited to such features except as ultimately set forth in the claims.

I claim as my invention:

1. In a machine for handling hairpins, or similar articles, the combination with a continuously advancing conveyor for said articles, of automatically operated gripping jaws for removing the articles from the conveyor, forcing means to which the articles are advanced for applying said articles to suitable holding means.

2. In a machine for handling hairpins, the combination with a continuously advancing conveyor for said articles, of gripping jaws for removing the articles from the conveyor, and means whereby the articles are automatically advanced to plunger mechanism for forcing an adjustment of the articles to suitable holding means.

3. In a machine for handling hairpins or similar articles, the combination with a continuously advancing conveyor for said articles, of gripping jaws for removing the articles from the conveyor, means for releasing the pins from the gripping jaws, and mechanisms for applying the articles to suitable holding means.

4. In a machine of the character described, the combination with an intermittently driven shaft, of mechanisms comprising gripping and releasing means associated with said shaft, holding means, and means for firmly attaching the pins to said holding means, and a conveyor for moving said pins to said holding means.

5. In a machine of the character described, the combination with means for supplying a paper strip or like material, of longitudinal crimping means for acting on said strips, a constantly advancing conveyor for hairpins or like articles, gripping jaws for holding a hairpin, mechanism for actuating the gripping jaws to remove the hairpin from the conveyor, mechanism for positioning the hairpin to the crimped paper strip, means for releasing the gripping jaws from the pin and means for driving the pin whereby the pin is caused to impinge and stick into the said crimped paper strip.

6. In a machine of the character described, the combination with means for supplying a paper strip or like material, a constantly advancing conveyor for hairpins or like articles, gripping jaws for holding a hairpin, mechanism for actuating the gripping jaws to remove the hairpin from the conveyor, mechanism for positioning the hairpin to the paper strip, means for releasing the gripping jaws from the pin, means for driving the pin whereby the pin is caused to impinge and stick into the paper strip.

7. In a machine of the character described, the combination of an intermittently rotated cam shaft having cams for actuating mechanisms to automatically grip a hairpin, to position the same with relation to an intermittently fed retaining strip, mechanisms for intermittently advancing the retaining strip, mechanisms for causing the pin to adhere to the strip, mechanisms for adjusting the pins in the strip, and mechanisms for severing the strip into predetermined lengths.

8. In a machine of the character described, the combination with an intermittently rotating cam shaft, a constantly advancing conveyor for hairpins or similar articles, a retaining strip to receive the hairpins or like articles, cams on the cam shaft for actuating mechanisms for transferring, positioning, driving, advancing the retaining strip and a cam having time actuating relation to cutting mechanism whereby the strip with pins thereon is severed at predetermined times into predetermined lengths.

SOLOMON H. GOLDBERG.